United States Patent [19]

Leach

[11] Patent Number: 4,584,152

[45] Date of Patent: Apr. 22, 1986

[54] CONTROLLING FABRIC POROSITY

[75] Inventor: Jack Leach, Greensboro, N.C.

[73] Assignee: Burlington Industries, Inc., Greensboro, N.C.

[21] Appl. No.: 620,621

[22] Filed: Jun. 14, 1984

[51] Int. Cl.⁴ .................................................. B29H 9/02
[52] U.S. Cl. ...................................... 264/103; 139/35; 139/291 R; 264/136; 264/257
[58] Field of Search ................. 139/35, 291 R, 383 R, 139/384 R; 264/103, 136, 257, 271.1, 273

[56] References Cited

U.S. PATENT DOCUMENTS

| | | | |
|---|---|---|---|
| 1,122,448 | 12/1914 | Walsh. | |
| 1,910,946 | 5/1933 | Bonnin | 139/48 |
| 2,672,163 | 3/1954 | Walters | 139/116 |
| 2,988,801 | 6/1961 | Heiss | 428/89 |
| 3,143,149 | 8/1964 | Stoudenmire | 139/48 |
| 3,900,050 | 8/1975 | Strauss | 139/12 |
| 4,113,907 | 9/1978 | Haage et al. | 428/111 |

Primary Examiner—Donald Czaja
Assistant Examiner—V. Fischbach
Attorney, Agent, or Firm—Cushman, Darby & Cushman

[57] ABSTRACT

Fiber reinforced plastic products are produced in such a way that there is uniform resin dispersion throughout the product. Fabric is woven on a loom, and the reed dents of the loom are varied from the center to the edges of the fabric so that when the strain in the wrap and weft yarns is released once the fabric is removed from the loom, the fabric has uniform porosity. After removal of the fabric from the loom it is impregnated with a resin, such as epoxy, phenolic, or polyester resins, dried, formed into a desired product shape (as by molding), and the resin is cured. The loom reed utilized to produce the fabric has parallel frame portions with parallel reed wires extending between the frame portions with the dent size larger at edge sections of the reed than at intermediate sections, and with the dent size at intermediate sections larger than the dent size at a central section.

15 Claims, 3 Drawing Figures

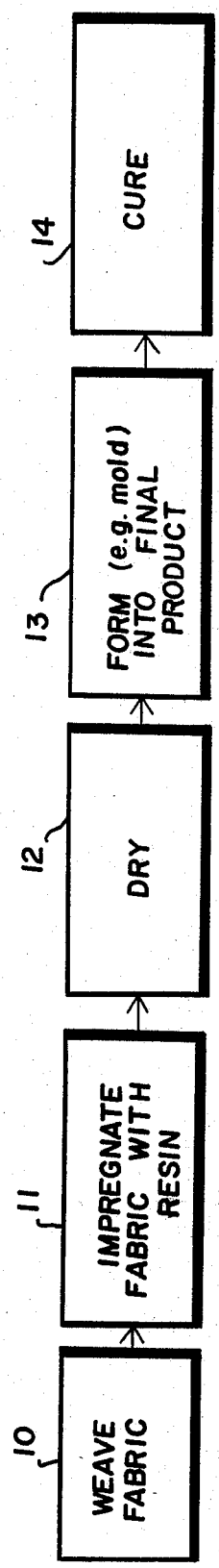
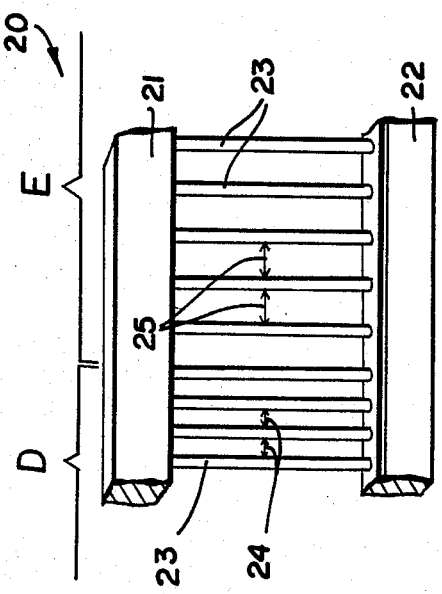
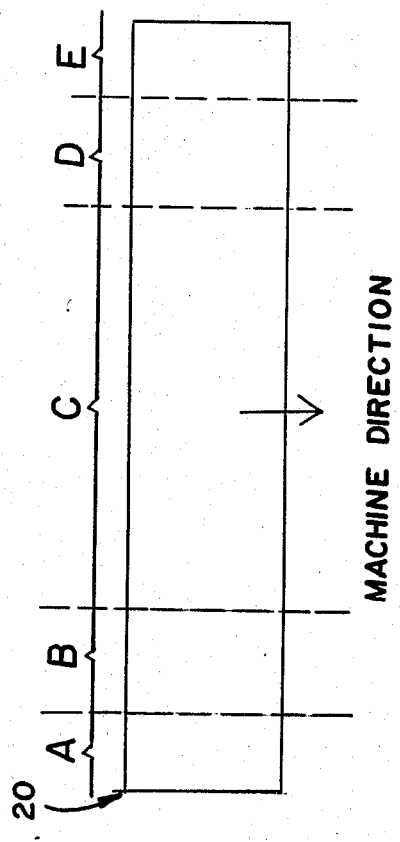

CONTROLLING FABRIC POROSITY

BACKGROUND AND SUMMARY OF THE INVENTION

In the manufacture of fiber reinforced plastic products, for many applications it is necessary that the resin dispersion throughout the product be uniform. If the resin to fiber ratio is too high, or too low, the products are unacceptable and must be rejected.

In the manufacture of fiber reinforced plastic products, fabric is woven from any of a number of fibers including glass, graphite, nylon, etc. The woven fabric is impregnated with resin, dried, formed into the final product shape (as by molding), and the resin is cured. It has been found, according to the present invention, that during the weaving of the fabrics, as a result of the natural strain provided on the warp threads, the edge areas become denser than the center area of the fabric. This happens as soon as the fabric is made and is especially noticeable once the fabric is removed from the loom. While the spacing of all of the warp yarns is originally uniform due to uniform spacing between the reed wires (that is uniform dents), after strain is removed, the warp threads in the edge areas of the fabric tend to move together. When such fabric is subsequently utilized to produce fiber reinforced plastic products, the fabric does not have uniform porosity therefore the resin dispersion after impregnation is non-uniform, and too high a percentage of rejects may be produced.

According to the present invention, a fiber reinforced plastic product is produced which has uniform resin dispersion throughout. The product according to the present invention is produced by the following method steps: (a) Weaving a fabric on a loom with warp ends and weft filling. (b) Varying the spacing between the warp ends at the edges of the fabric during weaving, compared to the warp ends at the centre of the fabric. (c) Removing the fabric from the loom such that as the strain on the warp and weft threads is relieved after removal of the fabric from the loom, the fabric has uniform porosity. (d) Impregnating the fabric with resin. (e) Drying the impregnated fabric. (f) Forming a final fiber reinforced plastic product having substantially uniform amounts of resin throughout its volume; and (g) curing the resin.

In the practice of the method according to the invention, one preferred manner of practicing step (b) is to provide a reed divided into a number of sections. For instance a center section, a pair of intermediate sections adjacent the center section, and a pair of edge sections adjacent the intermediate sections, may be provided. Within each section the reed dent size is uniform, and the dent size is also uniform within both edge sections and within both intermediate sections. The dent size in the edge sections is greater (e.g. 10–15 1,000ths of an inch) than the dent size in the intermediate sections, and the dent size in the intermediate sections is greater (e.g. about 10–15 1,000ths of an inch) than in the center section.

In addition, the fabric may be subjected to one or more finishing steps between steps (c) and (d).

According to the present invention a loom reed is also provided. The loom reed according to the invention comprises: a pair of frame portions, the frame portions being substantially parallel to each other and substantially co-extensive; a plurality of reed wires; and means for mounting the wires to the frame portions so that the wires extend substantially parallel to each other from one frame portion to the other, with dents fromed between the wires, with the dents at the end sections of the frame being larger than the dents at central portion of the frame. Again, the reed is preferably formed into edge, intermediate, and central sections with the dent size as indicated above. Alternatively, the wires may vary in thickness to provide variable spacing of substantially equal dents.

It is the primary object of the present invention to produce fiber reinforced plastic products having uniform resin dispersion throughout, and a loom reed for facilitating the production of such products. This and other objects of the invention will become clear from an inspection of the detailed description of the invention and from the appended claims.

BRIEF DESCRIPTION OF THE DRAWINGS

FIG. 1 is a schematic illustration of the production of fiber reinforced plastic products;

FIG. 2 is a schematic illustration of various sections of a loom reed utilized n the practice of the method of the invention; and FIG. 3 is a detail perpsective view of a section of the loom reed of FIG. 2.

DETAILED DESCRIPTION OF THE DRAWINGS

FIG. 1 schematically illustrates the practice of the method of producing fiber reinforced plastic products. First fabric is woven on a loom at station 10. The fabric may be produced from a wide variety of fibers such as glass, graphite, carbon, boron, ceramic, nylon, polyester, or aramid fibers, or a combination thereof. After the fabric is removed from the loom it is passed to station 11 wherein it is impregnated with resin. A wide variety of plastics may be utilized to impregnate the fabric, such as epoxy, imide, phenolic, and polyester resins. After impregnation, the fabric is passed to station 12 wherein it is heated to dry out the solvent in the resin. The fabric then is stored at controlled conditions until such a time it is to be formed into a final product at station 13. It may be formed into the final product by being cut and bent into shape, or molded in a die or in a simple mold. In any event once it is formed into the desired final product shape, it is cured at station 14.

In order for the fiber reinforced plastic product according to the invention to be useful, in many applications it is necessary that there be uniform resin dispersion throughout the product. This means that when the fabric is impregnated at station 11 the fabric must have uniform porosity (especially when highly viscous resins are used) so that all portions of the fabric receive the same amount of resin throughout the fabric volume. This result is achieved according to the present invention by practicing the weaving station 10 to produce a fabric having uniform porosity.

In the production of woven cloth, warp threads are woven together with filling threads, the warp threads extending in the machine direction and being under tension, and being subjected to strain, during the weaving process. Conventional looms include a reed which beats the filling threads solidly into position after which the warp threads are repositioned so that some or all of the previous "down" threads are then "up", and vice-versa. Conventional reeds include frame portions holding reed wires therebetween, with uniform spacing (dents) between the reed wires throughout the length of the reed.

According to the present invention it has been determined that once the strain has been removed from the weft threads and the strain on the warp threads is released as the fabric is removed from the loom at station 10, the edges of the fabric have a tendency to become more dense, so that the fabric does not have uniform porosity. According to the present invention, this adverse effect is compensated for by providing larger size dents (that is, spaces between the reed wires and therefore spaces between warp ends) at edge portions of the reed, than at central portions thereof.

In FIG. 2, a reed according to the invention is schematically illustrated by reference numeral 20. In the exemplary reed according to the present invention illustrated there are a pair of edge sections A, E, a pair of intermediate sections B, D, and a central section C. According to the preferred the sections B, D than in the section C. Typically the dent size would be controlled by controlling the number of reed wires per inch, rather than by varying the size of the reed wires. However, varying the size of the reed wires would be effective and is encompassed within the scope of the invention.

Exactly what the dent size will be will vary greatly depending upon the particular fabric to be produced, and depending upon all the other variables that go into the production of a fiber reinforced plastic product from the fabric (as schematically illustrated in FIG. 1). However, as one exemplary arrangement, for the reed 20 illustrated in FIG. 2 the dent size in the edge sections A, E would be equal in the two sections, and would be about 10-15 1,000ths of inch greater than the dent size in the two intermediate sections B, D; and the dent size in the sections B, D would be equal, and would be about 10-15 1,000th of an inch greater than the dent size in the central section C. For instance in the production of one exemplary fabric, the dent size in sections A and E would be 0.0526 inches, the dent size in sections B and D would be 0.0513 inches, and the dent size in section C would be 0.0500 inches.

The dent size specified above could be provided, for example, by providing 20 reed wires per inch in section C, 19.5 reed wires per inch in each of sections B and D, and 19 reed wires per inch in each of sections A and E.

The exact number, and relative widths of, the sections A-E of the reed 20 also will vary widely depending upon the particular fabric to be produced, etc. However in one exemplary form the central section C would be at least about 40 percent of the width of the reed 20. Sections B and D would each be about 20 percent of the width of the reed, an sections A and E would each be about 10 percent of the width of the reed. For instance for a reed 20 that was 50 inches wide, section C would be 20 inches wide, sections B and D each 10 inches wide, and sections A and E each 5 inches wide. Reed height is normally not critical.

FIG. 3 schematically illustrates in more detail a portion of a reed 20 according to the invention. The components in FIG. 3 are not drawn to scale, but rather various dimensions are enlarged or shortened for clarity of illustration.

The reed 20 includes frame sections 21 and 22 which are substantially parallel to each other, and substantially co-extensive. Extending between the sections 21, 22 are a plurality of reed wires 23. Means are provided for mounting the reed wires 23 so that they extend parallel to each other, and so that there is the desired variable spacing between reed wires (that is variabe dent sizes) such as described above. The reed wires 23 may be mounted by the frames 21, 22 in any conventional manner.

As illustrated in FIG. 3, the size of the dents 24 in section D are less than the size of the dents 25 in section E, the dent sizes being determined by the particular fabric to be produced, and other variables. The dent sizes will be designed so that once the strain on the weft and warp yarns is released, the fabric will have uniform porosity so that when it is impregnated with resin at station 11, the resin dispersion will be substantially uniform throughout the fabric.

It will thus be seen that according to the present invention it is possible to produce a fiber reinforced plastic product having uniform resin dispersion throughout. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods, structures, and products.

What is claimed is:

1. A method of producing fiber reinforced plastic products comprising the steps of:
   (a) weaving a fabric on a loom with warp ends and weft filling;
   (b) varying the spacing between the warp ends at the edges of the fabric during weaving, compared to the warp ends at the center of the fabric;
   (c) removing the fabric from the loom such that as a strain on the warp and weft yarns is relieved after removal of the fabric from the loom, the fabric has uniform porosity;
   (d) impregnating the fabric with resin;
   (e) drying the impregnated fabric;
   (f) forming a final fiber reinforced plastic product having substantially uniform amounts of resin throughout its volume; and
   (g) curing the resin.

2. A method as recited in claim 1 wherein step (b) is practiced by providing a reed having a first dent width at each of two opposite edge sections of the fabric; and a second dent width at two opposite sections of the fabric adjacent said fabric edge sections, said first dent width being greater than said second dent width.

3. A method as recited in claim 2 wherein said second fabric sections are intermediate fabric sections, and wherein the fabric comprises a central section, said central section having a third dent width, said third dent width being less than said second dent width.

4. A method as recited in claim 3 wherein said central section is larger than either of said intermediate sections or said edge sections.

5. A method as recited in claim 3 wherein each intermediate section is larger than a said edge section.

6. A method as recited in claim 2 wherein the dent width in each of said edge sections is about 10-15 1000ths of an inch greater than in said section adjacent said edge sections.

7. A method as recited in claim 3 wherein the dent width in said central section is about 10-15, 1000ths of an inch less than the dent width in said intermediate sections, and wherein the dent width in said intermediate sections is about 10–15 1,000ths of an inch less than the dent width in said edge sections.

8. A method as recited in claim 1 wherein step (a) is practiced utilizing fibers for the construction of the fabric selected from the group consisting of glass, graphite, carbon, boron, ceramic, nylon, polyester, and aramid fibers, and combinations thereof.

9. A method as recited in claim 8 wherein step (d) is practiced utilizing a resin selected from the group consisting of epoxy, imide, phenolic, and polyester resins.

10. A method as recited in claim 9 wherein step (f) is practiced by molding the impregnated fabric into the desired shape.

11. A method as recited in claim 1 wherein step (d) is practiced with a highy viscous resin.

12. A method as recited in claim 1 wherein a said fabric is subjected to a finishing step between steps (c) and (d).

13. A fiber reinforced plastic product having uniform resin distribution throughout, and produced by practicing the steps of:

(a) weaving a fabric on a loom with warp ends and weft filling;
(b) varying the spacing between the warp ends at the edges of the fabric during weaving, compared to the warp ends at the center of the fabric;
(c) removing the fabric from the loom such that as a strain on the warp and weft yarns is relieved after removal of the fabric from the loom, the fabric has uniform porosity;
(d) impregnating the fabric with resin;
(e) drying the impregnated fabric;
(f) forming a final fiber reinforced plastic product; and
(g) curing the resin.

14. A fiber reinforced plastic product as recited in claim 13 wherein the resin is a highly viscous resin.

15. A fiber reinforced plastic product as recited in claim 13 wherein the resin is selected from the group consisting of epoxy, imide, phenolic, and polyester resins; and wherein the fibers of the fabric are selected from the group consisting essentially of glass, graphite, carbon, boron, ceramic, nylon, polyester, and aramid fibers, and combinations thereof.

* * * * *

UNITED STATES PATENT AND TRADEMARK OFFICE
CERTIFICATE OF CORRECTION

PATENT NO.   :   4,584,152
DATED        :   April 22, 1986
INVENTOR(S)  :   LEACH, Jack It is certified that error appears in the above-identified patent and that said Letters Patent is hereby corrected as shown below:

Column 1, line 57, line 60, Column 3, line 34, line 37, Claim 6, line 3, Claim 7, lines 2 and 5, "1000ths" should read "10,000ths" in each occurrence. Column 1, line 43, "Imprenating" should read "Impregnating". Column 2, line 3, "fromed" should read "formed"; line 5, "portion" should read "portions"; line 23, "n" should read "in"; line 25, "perpsective" should read "perspective". Column 3, line 20, after "preferred", insert the following: "embodiment of the invention, the dent size is controlled so that it is greater in the sections A and E than it is in the sections B and D, and is further controlled so that it is greater in". Column 3, line 20, after "B,D than" insert "it is".

Signed and Sealed this

Fifteenth Day of September, 1987

Attest:

DONALD J. QUIGG

Attesting Officer

Commissioner of Patents and Trademarks